United States Patent [19]

Slater et al.

[11] 4,304,957
[45] Dec. 8, 1981

[54] ELECTRICAL OUTLET BOX

[75] Inventors: Thomas S. Slater, Port Washington; Wade R. Bowden, Jr., Northport, both of N.Y.

[73] Assignee: Slater Electric Inc., Glen Cove, N.Y.

[21] Appl. No.: 22,991

[22] Filed: Mar. 22, 1979

Related U.S. Application Data

[63] Continuation-in-part of Ser. No. 879,767, Feb. 21, 1978.

[51] Int. Cl.³ .............................................. H02G 3/08
[52] U.S. Cl. .................................. 174/65 R; 174/58; 220/3.6; 248/27.1
[58] Field of Search .................... 174/48, 49, 53, 58, 174/65 R; 220/3.2, 3.3, 3.4, 3.5, 3.6; 248/27.1

[56] References Cited

U.S. PATENT DOCUMENTS

| | | | |
|---|---|---|---|
| 1,039,955 | 10/1912 | Keefe . | |
| 1,540,893 | 6/1925 | Merrill | 220/3.6 |
| 1,971,908 | 8/1934 | Fullman . | |
| 1,980,831 | 11/1934 | Rosenfield . | |
| 2,401,948 | 6/1946 | Loy | 174/53 |
| 2,466,504 | 4/1949 | Stoyer . | |
| 2,688,417 | 9/1954 | Bowers . | |
| 2,814,510 | 11/1957 | Clark . | |
| 2,850,300 | 9/1958 | Jennings . | |
| 3,084,958 | 4/1963 | Appleton . | |
| 3,112,938 | 12/1963 | Karlin . | |
| 3,119,895 | 1/1964 | Palmer | 174/53 X |
| 3,169,007 | 2/1965 | Duffy et al. | 248/27.1 X |
| 3,288,407 | 11/1966 | Downer et al. | 174/153 G X |
| 3,493,205 | 2/1970 | Bromberg . | |
| 3,788,582 | 1/1974 | Swanquist . | |
| 3,873,759 | 3/1975 | Schindler et al. . | |
| 3,926,330 | 12/1975 | Deming et al. | 174/58 X |
| 3,966,152 | 6/1976 | Bromberg | 248/27.1 |
| 4,007,852 | 2/1977 | Gernhardt . | |
| 4,082,915 | 4/1978 | Silver . | |
| 4,202,457 | 5/1980 | Tansi | 220/3.3 |

FOREIGN PATENT DOCUMENTS

| | | |
|---|---|---|
| 2349766 | 6/1974 | Fed. Rep. of Germany . |
| 459323 | 9/1968 | Switzerland . |
| 349319 | 10/1970 | Switzerland . |

OTHER PUBLICATIONS

Brochure showing #425 Bush-Grip Connectors made by Blackhawk Industries, Dubuque, Iowa.

Primary Examiner—Gene Z. Rubinson
Assistant Examiner—D. A. Tone
Attorney, Agent, or Firm—Morgan, Finnegan, Pine, Foley & Lee

[57] ABSTRACT

An electrical outlet box having wall areas recessed inwardly from the outermost periphery of the box wall structure, the recessed areas housing pawl mounting devices and electrical power cable entry ports. The cable entry ports have self-opening and/or self-clamping closure panels extending angularly inwardly from the rim of the port which are also self-centering and self-adjusting for different cable sizes.

10 Claims, 6 Drawing Figures

ELECTRICAL OUTLET BOX

RELATED APPLICATIONS

This application is a continuation-in-part of copending application Ser. No. 879,767, filed Feb. 21, 1978, also assigned to the assignee of this application, the disclosure of which is hereby expressly incorporated herein by reference as if fully set forth herein.

BACKGROUND AND OBJECTS OF THE INVENTION

1. Field of the Invention

The present invention relates generally to electrical outlet boxes and the like and relates more particularly to certain new and useful improvements in the configuration of such boxes, in provisions for mounting such boxes in a suitable wall opening, in the location and orientation of the cable entry ports for the admission of electrical power cable into the outlet box, and in combinations of the foregoing features.

It will be understood that although the present invention is described with particular reference to electrical outlet boxes which are adapted to house the termination (i.e., electrical connection) between an electrical power cable and an electrical fixture such as an electrical outlet receptacle or an electrical switch, the present invention can be adapted, where desired, for use in other housing for electrical distribution appliances, such as electrical junction boxes, flush type boxes, etc. Accordingly, when used herein, the term "electrical outlet box" is intended to embrace such additional structures.

The usual electrical outlet box is constructed in a generally box-like configuration with a generally continuous sidewall member depending from a back (or bottom) wall, and formed with one or more cable entry ports (hereinafter sometimes referred to as "knockout windows") in the side wall member, which are adapted to permit access to the interior of the box for electrical power cables. One or more electrical power cables are inserted into the box, each through a cable port opening, for connection to (or termination with) the electrical fixture to be mounted in the box. Moreover, in order to prevent debris from entering the box through cable ports that are not utilized, and to minimize fire spread in the event that the electrical appliance housed in the box malfunctions, the typical cable entry ports in electrical outlet boxes are substantially or completely closed by knockout panels which are removably attached to the box wall structure across each port opening.

It will also be understood that although the present invention is described with respect to a rectangularly-shaped electrical outlet box, the invention is equally applicable to other conventionally shaped boxes, including round boxes.

2. Description of the Prior Art

Heretofore, it has been conventional in electrical outlet boxes for the outermost periphery of the box wall structure to be comprised of substantially straight walls or, in the case of a round box, for the wall structure to be located at a substantially constant radial distance from the center of the box. These conventional structures are disadvantageous in certain usages since they cause the electrical power cable and certain box mounting devices to protrude laterally from the outermost periphery of the wall structure, thereby obstructing entry and mounting of the box in a wall opening.

3. Objects of the Invention

It is therefore an object of this invention to provide a new and improved electrical outlet box.

Another object of this invention is to provide a new and improved electrical outlet box which is formed in a novel and improved configuration.

Another object of this invention is to provide a new and improved electrical outlet box which facilitates entry of the electrical power cable through the cable entry ports.

Another object of this invention is to provide a new and improved electrical outlet box which facilitates connection of the electrical power cable to an electrical fixture mounted to the box and also facilitates subsequent mounting of the outlet box within the wall opening.

Another object of this invention is to provide a new and improved electrical outlet box in which each end wall includes portions which are offset from one another so as to create recessed areas along the outermost periphery of the outlet box wall structure.

Another object of this invention is to provide a new and improved electrical outlet box configuration in which adjacent cable entry ports are laterally offset from one another.

Another object of this invention is to provide a new and improved electrical outlet box having one or more cable entry ports located in a wall section which is recessed inwardly from the periphery of the box wall structure.

Another object of this invention is to provide a new and improved electrical outlet box having one or more cable entry ports located in a wall section which is recessed inwardly from the periphery of the box wall structure, in which the cable entry ports have window closure panels which are secured adjacent the rim of the port and extend angularly inwardly therefrom towards each other.

Another object of this invention is to provide a new and improved electrical outlet box having one or more cable entry ports located in a wall section which is recessed inwardly from the periphery of the box wall structure, in which the cable entry ports have window closure panels which are secured adjacent the rim of the port and extend angularly inwardly therefrom towards each other, the closure panels being tapered along their inwardly extending length and joined at their point of convergence by a frangible web which may be readily pierced by the electrical power cable without the aid of a separate tool, the tapered closure panels thereafter clamping the cable against movement in a direction out of the box.

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

SUMMARY OF THE INVENTION

Briefly described, the electrical outlet box configuration of the present invention has wall portions which are laterally offset from one another so as to create wall areas recessed inwardly from the outermost periphery of the box wall structure. In the preferred embodiment of the invention illustrated in the drawings, each end wall of the box is laterally offset on either side of the electrical fixture mounting post, creating diagonally opposed inwardly recessed areas in the outermost periphery of the box wall structure.

As preferably embodied, one or more cable entry ports for the passage of electrical power cable into the outlet box are housed in a portion of the box wall structure which is recessed inwardly from the outermost periphery of the box wall.

Also as preferably embodied in the electrical outlet box of the present invention, the cable entry ports include a pair of window closure panels which are formed integral with the end wall at the rim of the port along opposed sides thereof and extend angularly inwardly therefrom. The free ends of the panels may terminate at points which are closely adjacent but spaced apart from one another or, alternatively, may be joined together at their inner ends by a frangible web which preferably is readily pierceable by manually forcing the end of the electrical power cable against the web.

It will be apparent from the foregoing general description that the objects of the invention specifically enumerated herein are accomplished by the invention as here embodied.

Thus, the novel configuration of the electrical outlet box of this invention, wherein portions of the box wall structure are recessed from the outermost periphery of the box walls and both cable entry ports and the pawl mounting device are located in recessed wall regions, facilitates cable entry and mounting of the box within the wall opening. Recessing the cable entry ports permits the electrician to locate the portion of the electrical power cable extending outwardly from the port either closely adjacent, or entirely within the confines of the outermost periphery of the box walls, thus facilitating insertion of the wired box into the wall opening. The provision of both recessed cable entry ports and ports having diagonally inwardly inclined closure panels serves to position the cable even further inward of the outermost periphery of the box walls, facilitating even further the insertion of the wired box into the wall opening.

It will be understood that the foregoing general description and the following detailed description as well are exemplary and explanatory of the invention but are not restrictive thereof.

The accompanying drawings, referred to herein and constituting a part hereof, illustrate preferred embodiments of the invention, and together with the description, serve to explain the principles of the invention.

DESCRIPTION OF THE PREFERRED EMBODIMENTS

Figure 1:
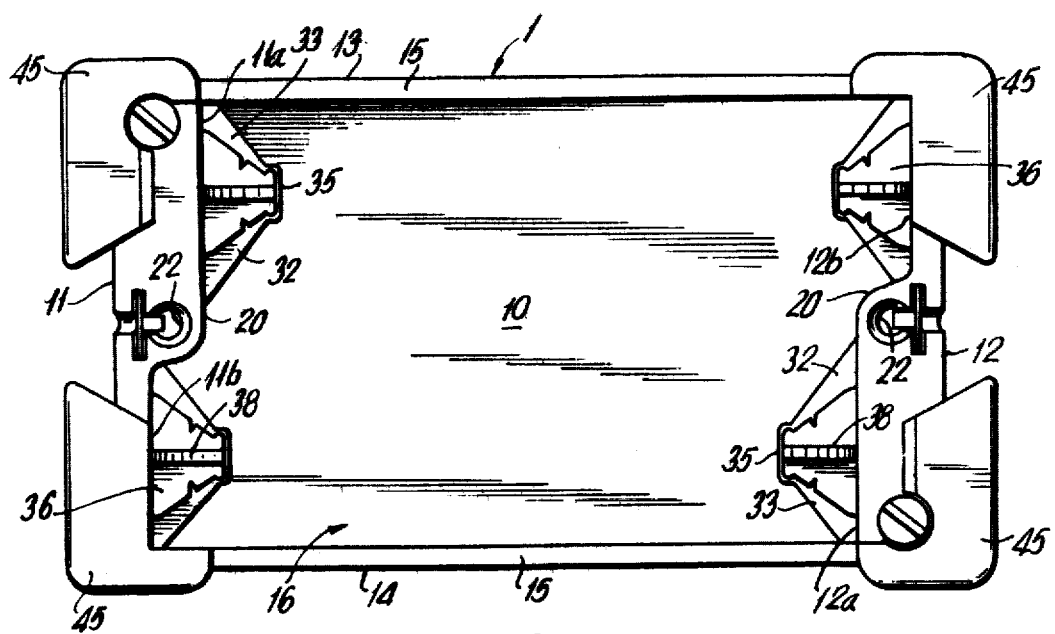
FIG. 1 is a top plan view of an electrical outlet box constructed in accordance with a preferred embodiment of the invention.

Referring now more particularly to the embodiments of the invention shown in the accompanying drawings, wherein like reference numerals refer to like parts, there is illustrated an electrical outlet box, indicated generally by reference numeral 1, mounted in a suitably sized opening 2 in a wall structure 3.

As here preferably embodied, electrical outlet box 1 is of a generally rectangular shape and includes a bottom wall 10, a pair of opposed end walls 11, 12, a pair of opposed side walls 13, 14 extending between the aforesaid end walls, each of the end and side walls terminating in a continuous front edge 15 lying in a frontal plane which is parallel to the bottom wall 10 and defines the front opening 16 of the box. Outlet box 1 also includes an opposed pair of conventional mounting post members 20 adjacent each of the end walls 11, 12 for securing an electrical fixture to the box by threaded fasteners, as is well known in the art. Advantageously, each of posts 20 includes an unthreaded borehole 22 and a mounting clip 23 (see FIG. 2) slidably lockably received in each of the posts adjacent the borehole for quick fastening of a threaded screw thereto, such as is more fully described in U.S. Pat. Nos. 3,955,463 and 4,105,862, the disclosures of which are incorporated herein by reference.

In accordance with the invention, outlet box 1 is provided with recessed areas in the outermost periphery of the wall structure. To this end, as here preferably embodied, diagonally opposed sections 11a, 12a of the end walls 11, 12 respectively, are recessed inwardly between one side of the electrical fixture mounting post member 20 and the adjoining side walls 13, 14, respectively.

In the embodiment of the invention illustrated in the drawings, outlet box 1 is approximately 3 inches deep, 2⅝ inches wide, 3⅜ inches long and approximately 18 cubic inches interior volume. In this embodiment, sections 11a, 12a of outlet box 1 are recessed inwardly approximately one-quarter of an inch (¼") from the outer surface of the adjacent end wall sections 11b, 12b, respectively. While it has been found that approximately ¼" is the preferred depth of recessed sections 11a, 12a for carrying out the invention in an outlet box having the aforesaid dimensions, the invention is not limited to any particular size box or depth of recess and the foregoing dimensions are given as an example, from which other equivalent dimensions will be apparent to those of ordinary skill in the art.

Also, as previously mentioned, it will be understood that, although the illustrated rectangular outlet box presently is the preferred embodiment of the invention, the invention is not limited to any particular box configuration, and its application to boxes of other configurations, such as round boxes, will be readily apparent to those of ordinary skill in the art.

Figure 6:
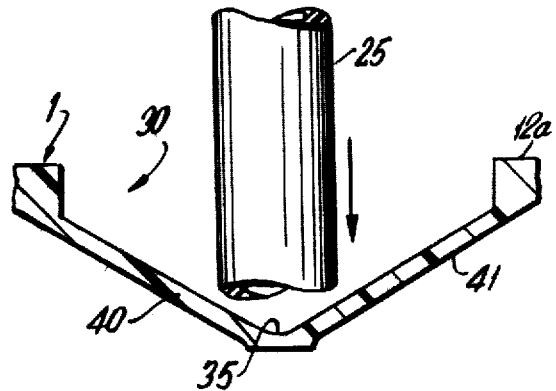
FIG. 6 is a fragmentary sectional view of an alternative embodiment of a cable entry port constructed in accordance with the invention.
Figure 2:
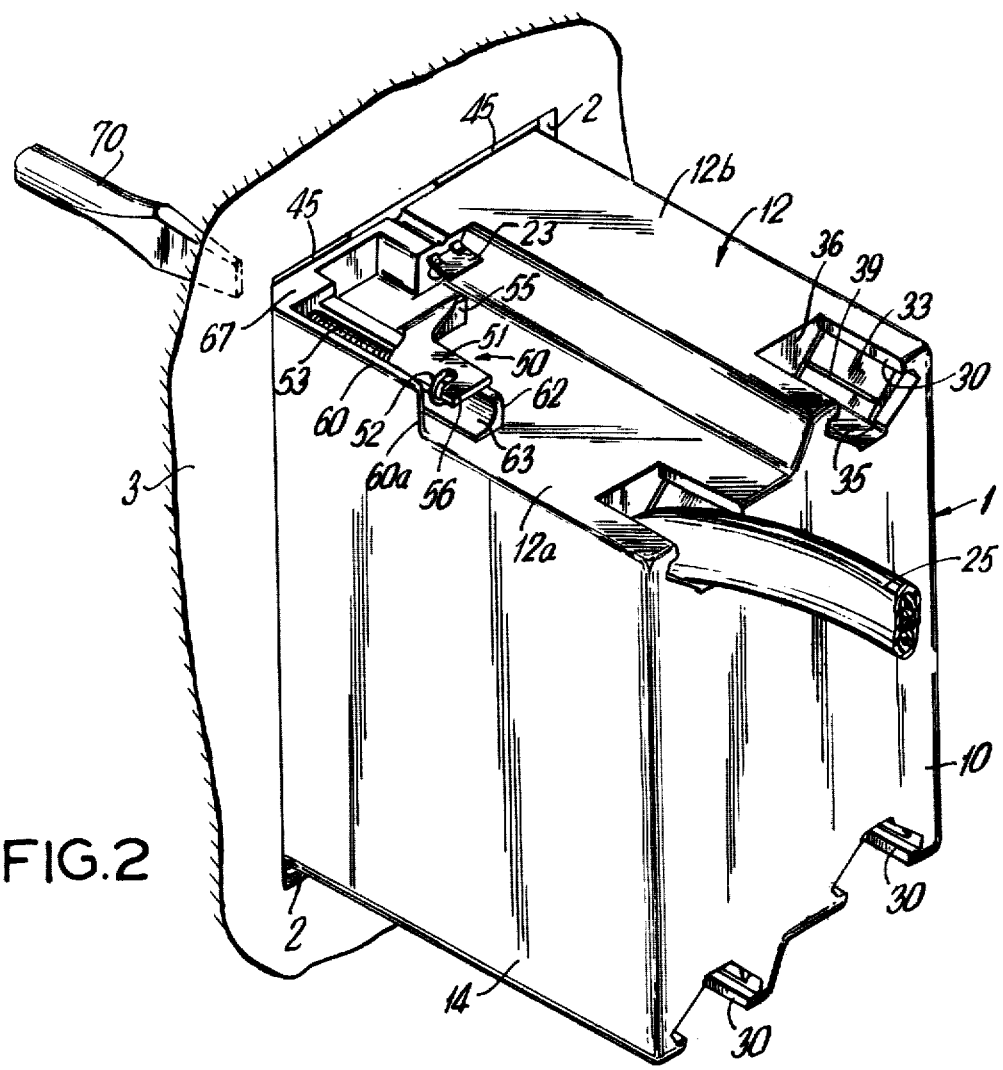
FIG. 2 is a rear perspective view of the outlet box of FIG. 1, the view illustrating the box positioned within a wall opening and further illustrating a preferred embodiment of the pawl mounting means of the invention with the pawl arm in its retracted position.

Advantageously, and as here preferably embodied, recessed areas 11a, 12a house cable entry port means for the passage of conventional electrical power cable, illustrated at 25 in FIGS. 2 and 6, into outlet box 1 for connection to an electrical fixture (not shown) mounted in the outlet box.

In accordance with the invention, the cable entry port means are adapted to facilitate entry of the electrical power cable into the outlet box as well as to facilitate mounting of the wired outlet box in a wall opening.

Figure 5:
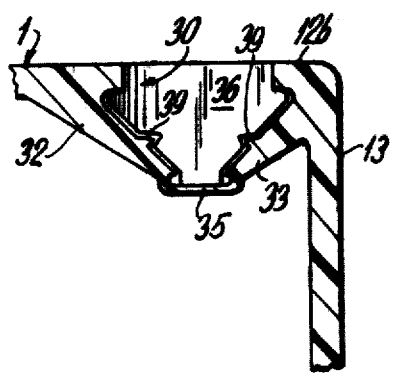
FIG. 5 is a fragmentary view, partly in section and partly in bottom plan, of the cable entry port structure of the outlet box of FIG. 1.

To this end, as best depicted in FIGS. 1, 2 and 5, the preferred cable entry port means is comprised of an opening or port 30 in the end walls 11, 12 adjacent bottom wall 10 which is preferably formed with a pair of opposed closure panels 32, 33 extending from the rim of the port opening diagonally inwardly toward each other and terminating at points which are closely adjacent but spaced apart from one another a distance which is preferably less than the narrowest width of conventional electrical power cable. A frangible web 35 preferably joins the adjacent innermost ends of the closure panels. Advantageously, and as preferably embodied, web 35 is adapted to be broken by manually forcing the end of a conventional electrical power cable against the web. Although web 35 is shown extending along the entire length of the convergent ends of panels 32, 33, alternatively, and with equally satisfactory results, web 35 may extend between the convergent ends of panel 32, 33 along only a short portion of their length, on the order of approximately ⅛-¼ inch, preferably at the midsection thereof.

In the embodiments shown in FIGS. 1, 2 and 5, also by way of example rather than limitation, the port openings 30 are approximately one-half inch wide (½") and one-half inch long (½"). When formed from an injection moldable thermoplastic resin material, more fully described hereinafter, the point of convergence of closure panels 32, 33 is approximately three-eighths inch (⅜") from the inside surface of end wall 12a, frangible web 35 is approximately 0.010" thick, and panels 32, 33 taper from a thickness of about 0.030" (approximately 1/32") thick at their convergent ends to about 0.060" (approximately 1/16") thick at their bases adjacent the aperture rim.

Also, as preferably embodied, the generally V-shaped space between closure panels 32, 33, which opens in a direction perpendicular to the frontal plane of the box, is at least substantially closed by a third closure panel 36 extending transversely and closely adjacent to the frontmost edges of the angled closure panels 32, 33. Advantageously, a reinforcing rib or strut 38 is formed to extend between the top of port closure panel 36 and the inside surface of end walls 11, 12. Also, as best seen in FIGS. 1 and 5, angled closure panels 32, 33 preferably are tapered, having increased thickness at the base thereof adjacent the rim of the port opening, and include supplementary cable gripping projections 39 on their opposed facing surfaces.

It will be seen from the foregoing that the cable entry port means of the invention as preferably embodied are both self-opening and self-clamping. The port means are self-opening in that no separate tool such as a screwdriver or the like is required in order to break the frangible closure web 35. In the embodiment where the closure panels are tapered, depicted in FIGS. 1, 2 and 5, the port means are also self-clamping since, upon inward movement of the cable into the box chamber, the angularly inwardly directed closure panels are slightly spread apart to thereby resistingly bear against the cable and, consequently, a reverse outward force applied to the cable thereafter causes the inner end portions of the closure panels to be urged by means of a camming action progressively more tightly against the cable, into increasing gripping engagement therewith, thereby effectively clamping the cable against reverse outward movement.

The cable entry port means of the invention as preferably embodied are also both self-centering and self-adjusting for different sizes of electrical power cables passing into said box chamber. Thus, the provision of inwardly angled closure panels serves to guide the electrical power cable into the box at a predetermined, consistent location, which is at the apex of the converging panels, irrespective of the cable size. Also, the preferred lengths and thicknesses of the closure panels, particularly when formed from a moldable plastic material, as is more fully described hereinafter, provide the panels with sufficient flexibility and resiliency so that they deflect laterally away from the point of convergence, thereby permitting the panels to adjust to the different cable sizes, and yet resistingly bear against the cable in their deflected condition. By recessing the base of the closure panels away from the aperture rim, as illustrated in FIG. 5, cables having thicknesses up to a thickness equal to the width of the entry aperture can be accommodated with satisfactory results.

In an alternative embodiment of the invention depicted in FIG. 6, the cable entry port closure panels extend angularly inwardly from the rim of the port opening and are self-opening, as well as self-centering and self-adjusting, but provide only slight clamping action against the electrical power cable. As alternatively embodied, the opposed closure panels 40, 41 are of a uniform thickness throughout which is relatively thin, on the order of about 0.030" (approximately 1/32") thick, and the frangible connecting web 35 is on the order of about 0.010" thick, when injection molded from a thermoplastic resin material, more fully described hereinafter. In this embodiment, the inwardly converging closure panels 40, 41 are advantageous in use since, in a manner similar to closure panels 32, 33, they flex only a distance sufficient to permit the cable to pass through the port, thereby maintaining a substantially closed opening even in use. In addition, as depicted in FIG. 2, both of the aforesaid embodiments of the cable entry port means of the invention facilitate mounting of the box in a wall opening, since the cable enters the box partially through the generally V-shaped opening provided in the bottom wall of the box at the cable entry ports. As depicted in FIG. 2, particularly where the cable entry port is formed in the recessed wall sections 11a, 12a, the aforesaid structure enables the electrical power cable to be easily extended from the box with no part thereof protruding laterally beyond the outermost periphery of the box wall structure.

The foregoing embodiments of the cable entry port means of the present invention are described in greater detail in copending application Ser. No. 879,767, filed Feb. 21, 1978, also assigned to the assignee of this application. The disclosure of application Ser. No. 879,767 is hereby expressly incorporated herein by reference, and reference may be made to that application for a discussion of the further advantages of these structures.

Although the cable entry port structures illustrated here and in application Ser. No. 879,767 show the base of the closure panels attached to the box wall structure along the longitudinal rim portions of the port opening which extend in a direction from the front to the back of the box, it will be understood that the principles underlying the invention are not limited to this particular orientation, but are equally applicable to the attachment of the closure panels along the top and bottom rim portions of the port opening, in which case the third closure panel extends in a plane parallel to the opposed side walls and adjacent the lateral converging side edges of the opposed closure panels so as to cover the generally V-shaped space therebetween opening in a direction perpendicular to the opposed side walls of the box. This alternative configuration is illustrated in copending application Ser. No. 22,993, filed concurrently herewith and assigned to the assignee of this application, the disclosure of which is hereby expressly incorporated herein by reference as if fully set forth herein.

Also, while the cable entry ports illustrated here and in application Ser. No. 879,767 are rectangular in shape and include a pair of opposed converging closure panels, it will be understood that the invention is equally applicable to other port entry configurations, such as an aperture having a circular shape, and to the provision of either a single or a plurality of closure panels extending angularly inwardly from the rim of the port opening such, e.g., as is shown in the aforesaid copending application Ser. No. 22,993.

As here preferably embodied, recesses 11a, 12a also house means for mounting outlet box 1 to the wall structure surrounding an opening suitably sized to receive an outlet box therethrough. To this end, outlet box 1 includes two or more flanges 45 on the front edge of the box wall structure extending perpendicular to the box walls laterally outwardly beyond the outermost periphery thereof, and pawl mounting means 50 adapted to clamp the edge of the wall structure 3 between box flanges 45 and pawl clamping flange 55, more fully described immediately hereafter.

Pawl mounting means 50 includes a pawl clamping arm 51 adapted to be rotated between retracted and extended positions and to travel in a linear direction in the extended position into and out of clamping engagement with the back side of wall 3. Pawl mounting means 50 also is adapted to restrain rotational movement of the pawl clamping arm 51 in both clockwise and counterclockwise directions over at least a portion of the linear travel of the pawl arm by means of a single stop flange on the outlet box wall.

To this end, pawl arm 51 includes a generally semicylindrical hub portion 52 into which a threaded mounting screw 53 is fastened. Hub 52 may be provided with internal threads mating the threads of screw 53 or, alternatively, screw 53 may be a thread-cutting screw which cuts threads into hub 52 upon being threadably fastened thereto. Planar clamping arm 51 extends tangentially of hub 52, terminating on one side of the hub in a right-angled clamping flange 55 and terminating on the other side of the hub in a small tab member 56, coplanar with and preferably an integral part of pawl clamping arm 51.

Figure 3:
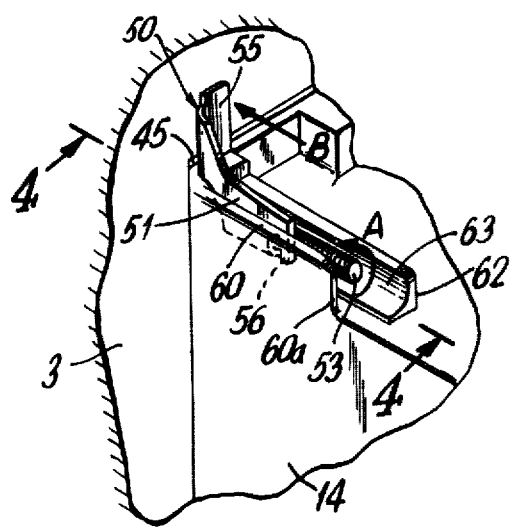
FIG. 3 is a fragmentary rear perspective view of the outlet box of FIG. 1, illustrating the pawl arm in its extended position engaging the back surface of the wall structure in which the outlet box is mounted.

A stop flange 60 extends laterally outwardly, preferably as an integral extension, from the portions of side walls 13, 14 which adjoin the end wall recessed areas 11a, 12a, respectively. Advantageously, as depicted in FIGS. 2 and 3, flange 60 extends laterally outwardly a distance equal to the recess of the end wall sections 11a, 12a, so as to terminate in the plane of the outermost end wall sections 11b, 12b, respectively. Flange 60 extends in the longitudinal direction from the front edge 15 of the box walls preferably to the approximate mid-point between the frontal plane and back wall of the box.

A rib 62 extends in parallel, spaced apart relation to flange 60 and preferably has a concave arcuate side 63 facing flange 60. Rib 62 is spaced from flange 60 a distance sufficient to form a groove-like guide channel adjacent flange 60 adapted to slidably receive and guide hub 52 of the pawl arm 51 in back and forth linear travel.

Rib 62 extends along at least the length of flange 60, and preferably extends a short distance beyond the end 60a of flange 60 in order to ease assembly of pawl 51 onto box 1, more fully described hereinafter. Rib 62 extends laterally outwardly from end wall 12a a distance approximately equal to the width of the pawl clamping flange 55 so that the pawl arm is located fully within the confines of the recessed area 12a in its retracted position.

Figure 4:
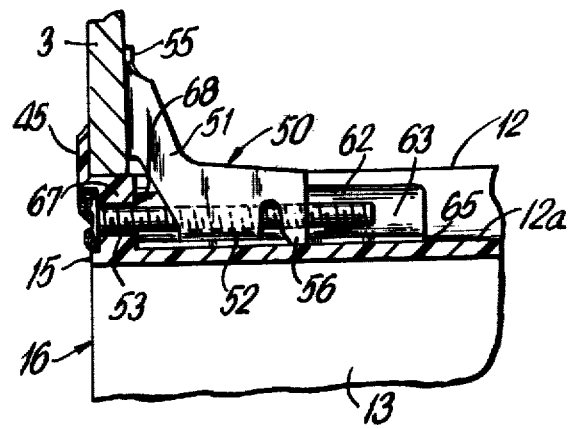
FIG. 4 is a fragmentary view, partly in elevation and partly in section, taken along line 4—4 of FIG. 3, the view illustrating the outlet box clamped to the wall structure.

As best seen in FIG. 4, arcuate face 63 of rib 62 holds hub 52 away from the outer surface of end wall 12a a distance at least equal to the distance that tab 56 extends beyond the periphery of the hub, so as to create an additional slot-like channel 65 adjacent flange 60 adapted to freely receive tab 56 of pawl 51 therein and permit tab 56 to freely ride in channel 65 in back and forth linear travel.

Finally, a boss member 67 is formed integral with the end wall section 12a adjacent the front edge 15 of the box wall structure and is provided with an aperture 68 therein aligned with the channel between flange 60 and rib 62, aperture 68 being adapted to receive threaded mounting screw 53 therethrough.

It will be apparent from the foregoing that the pawl mounting means is assembled by partially threading mounting screw 53 into the hub 52 of the pawl arm 51 by means of a screwdriver 70 or the like so as to draw a portion of the hub 52 into the grooved guide channel between flange 60 and rib 62, as shown in FIG. 2. At this time, pawl arm 51 is in a retracted or "nested" position, where it rests on the top edge of rib 62 and clamping flange 55 rests against the outer surface of end wall 12a, the entire device being positioned within the confines of the recessed area between flange 60 and end wall 12b.

Thereafter, continued rotation of mounting screw 53 in a clockwise direction when viewed from the handle end of screwdriver 70, illustrated by arrow A in FIG. 3, rotates the pawl arm 51 from the retracted position into an extended position where it engages stop flange 60 which prevents further rotation of the arm in the clockwise direction. Thereafter, continued clockwise rotation of the threaded mounting screw 53 causes the pawl hub 52 to travel linearly, illustrated by arrow B in FIG. 3, within the groove-like guide channel between flange 60 and rib 62 toward clamping engagement with wall 3, at which time the pawl clamping flange 55 engages the back side of wall 3. As the pawl hub 52 travels linearly toward clamping engagement with wall 3, the pawl tab 56 rides freely within channel 65 adjacent the flange wall 60, while the pawl arm 51 engages and is urged into sliding relationship against the outer portion of flange wall 60. Upon rotation of screw 53 in an opposite counterclockwise direction, pawl tab 56 engages and is urged into sliding relationship against the bottom portion of flange wall 60, restraining rotation of pawl arm 51 so as to cause the pawl hub 52 and clamping flange 55 to again travel linearly in the opposite direction of arrow B, out of clamping engagement with wall 3 and toward the retracted position. As pawl hub 52 travels beyond the end 60a of the flange wall 60, tab 56 no longer restrains rotation of the pawl arm 51, whereupon the pawl once again rotates into its original retracted or "nested" position.

Thus, flange wall 60 serves as a single pawl stop to prevent rotation of the pawl arm 51 during both clockwise and counterclockwise movement of the mounting screw 53 as the pawl moves linearly in its extended position into and out of clamping engagement with wall 3.

While the foregoing description of the pawl mounting means has been primarily directed to the structure provided at the recessed wall area 12a, depicted in the drawings, it will be understood that an identical structure is also provided at the recessed wall area 11a.

While it will be understood from the foregoing description that neither the outlet box of the invention nor the pawl mounting means are in any way limited to the use of particular materials, the outlet box is preferably formed integrally from a molded thermoplastic resin material and the pawl arm member is preferably formed by die stamping a suitable metal.

With respect to the material from which the outlet box is formed, a certain injection moldable thermoplastic resin material has been found to produce highly satisfactory results and is given as an example of the preferred mode of carrying out the invention, together with other examples of suitable materials, from which still further equivalent materials will be apparent to those of ordinary skill in the art. Thus, it has been found that a thermoplastic resin blend of ABS (i.e., acrylonitrile-butadiene-styrene) and PPO (i.e., polyphenylene oxide) sold by the General Electric Company under the trade name "NORYL", Grades SE-100 or SE-1, is a particularly preferred material from the standpoint of ease of moldability, strength and high temperature resistance. Moreover, the "NORYL" material is sufficiently strong to meet the current standard of Underwriters' Laboratories, Inc. for outlet box cable clamping devices. It has also been found that a vinyl resin material such as PVC (i.e., polyvinyl choride) sold by the Ethyl Corporation under the trade designation "Ethyl 7042" operates satisfactorily where only slight clamping action against the cable is desired or necessary, as in the embodiment of the invention shown in FIG. 6. However, this material does not meet the aforementioned current Underwriters' Laboratories' standards for cable clamps in outlet boxes. In addition to the foregoing, the outlet box of the present invention may be formed integrally from a metallic material, for example, by east molding from aluminum or an aluminum alloy, or by die stamping the appropriate recessed wall portions and closure panel members from a suitable metal, such as, e.g., steel, the latter being thereafter bent inwardly to provide the cable entry port structure.

The invention in its broader aspects is not limited to the specific embodiments herein shown and described but departures may be made therefrom within the scope of the accompanying claims, without departing from the principles of the invention and without sacrificing its chief advantages.

What is claimed is:

1. In an electrical outlet box having a wall structure providing front to rear wall means and a bottom wall interconnected therebetween, the front to rear wall means and bottom wall defining a chamber within the wall structure which opens through the front of the box, said wall means defining an outermost periphery of said box and including wall portions which are recessed inwardly from said periphery so as to define recessed areas extending along said periphery of said box, from the front to the rear of said box, said recessed areas housing cable entry port means for the passage of electrical power cable into said box chamber, said cable entry port means includes a generally rectangular aperture in said front to rear inwardly recessed wall portion extending upwardly from said bottom wall, a generally V-shaped opening in said bottom wall converging inwardly from the longitudinally extending side rims of said aperture and opening in a direction generally perpendicular to said front of said box, and closure panel means depending from the longitudinally extending side rims of said aperture and terminating in free end portions, said free end portions being separated by a distance which is less than the narrowest dimension of the electrical power cable to be inserted therein, said free end portions of said closure panel means adapted to deflect laterally away from one another upon passage of a cable into said aperture and to thereafter resistingly bear against the installed cable.

2. An electrical outlet box as claimed in claim 1, wherein said front to rear wall means includes a pair of opposed side walls and a pair of opposed end walls interconnected between said side walls.

3. An electrical outlet box as claimed in claim 2, wherein said recessed areas are formed in said end walls.

4. An electrical outlet box as claimed in claim 2, including electrical fixture mounting post members adjacent the inside surface of each opposed end wall in opposed alignment generally centrally of said end walls, and wherein each end wall is offset on either side of said electrical fixture mounting post member.

5. An electrical outlet box as claimed in claim 4, wherein said recessed areas in said end walls are in diagonally opposed alignment.

6. An electrical outlet box as claimed in claim 1, including a frangible closure web joining said free end portions of said closure panel means, substantially preventing access into said box through said cable entry port means, said frangible closure web being readily pierceable by manual force of the end of said electrical power cable thereagainst.

7. An electrical outlet box as claimed in claim 6, wherein said frangible web extends along the entire length of said free ends of said closure panel means.

8. An electrical outlet box as claimed in claim 1, including a third closure panel member extending inwardly from the inside surface of said front to rear inwardly recessed wall portion transversely of and closely adjacent to the converging front edges of said closure panel means, said third closure panel member thereby substantially closing the generally V-shaped space formed between said closure panel means which opens in a direction perpendicular to the front of the box.

9. An electrical outlet box as claimed in claim 8, including a reinforcing strut extending between the top of said third closure panel member and the inside surface of said front to rear inwardly recessed wall portion.

10. An electrical outlet box as claimed in claim 1, wherein the bases of said closure panel means are recessed from said longitudinally extending side rims of said aperture.

* * * * *